United States Patent [19]

Lane

[11] Patent Number: 4,721,493
[45] Date of Patent: Jan. 26, 1988

[54] UNIVERSAL JOINT WITH INTERMESHING CURVILINEAR GEARS

[76] Inventor: Robert R. Lane, 1117 Larchmont La., Oklahoma City, Okla. 73116

[21] Appl. No.: 885,458

[22] Filed: Jul. 14, 1986

[51] Int. Cl.$^4$ .............................................. F16D 3/16
[52] U.S. Cl. ................................... 464/157; 81/177.75
[58] Field of Search ..................... 74/380; 81/177.75; 464/106, 109, 149, 157

[56] References Cited

U.S. PATENT DOCUMENTS

| | | | |
|---|---|---|---|
| Re. 22,555 | 10/1944 | Brooks | 464/109 X |
| 305,714 | 9/1884 | Schulze-Berge | 464/109 X |
| 912,096 | 2/1909 | Elkan | 464/109 |
| 1,196,268 | 8/1916 | Noel | 464/157 |
| 2,171,059 | 3/1938 | De Coudres | 464/109 |
| 2,397,003 | 3/1946 | Hambelton | 464/157 X |
| 3,036,446 | 5/1962 | Morgenstern | 464/109 |
| 4,114,401 | 9/1978 | Van Hoose | 81/177.75 X |
| 4,236,420 | 12/1980 | Geisthoff | 74/380 |
| 4,509,932 | 4/1985 | Weible | 464/109 |

FOREIGN PATENT DOCUMENTS

| | | | |
|---|---|---|---|
| 968,757 | 12/1950 | France | 81/177.75 |
| 241255 | 7/1946 | Switzerland | 464/149 |
| 15259 | of 1890 | United Kingdom | 464/149 |

Primary Examiner—Daniel P. Stodola
Attorney, Agent, or Firm—Laney, Dougherty, Hessin & Beavers

[57] ABSTRACT

A universal joint adapted for attachment to a socket wrench or similar device. The universal joint includes first and second bodies having adjacent convexly curved outer surfaces. Each body has a central axis, and the curved surface on each body defines a pole along the corresponding central axis. A plurality of angularly spaced teeth are provided on the curved surface of each body and extend from the pole thereon to a position along the side of the corresponding body. The teeth are adapted for meshing engagement regardless of the relative angular displacement between the central axes of the bodies. Each body defines a cavity therein and a hole extending from each cavity to the corresponding pole. A reciprocating plate is positioned in each cavity, and a flexible cable or wire interconnects the plates. Springs are positioned around the cables in the cavities for biasing the plates apart. In an alternate embodiment, an O-ring is provided as a bushing adjacent the pole of each body for guiding the wire and for minimizing wear on the wire and reducing the likelihood of binding during mutual rotation of the bodies.

17 Claims, 5 Drawing Figures

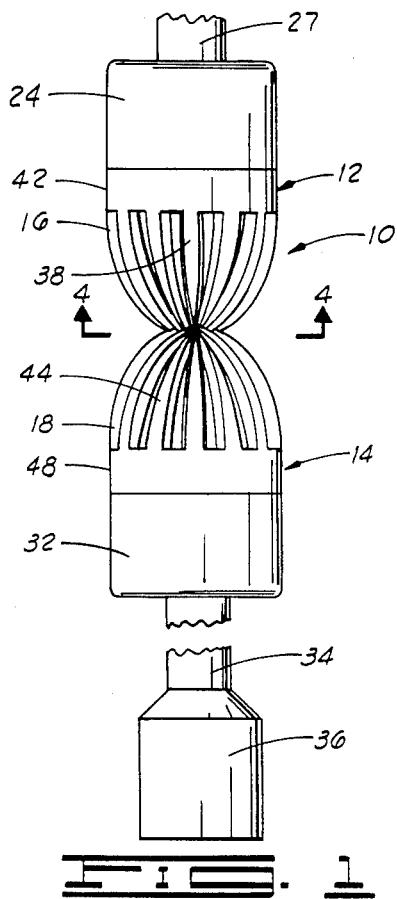
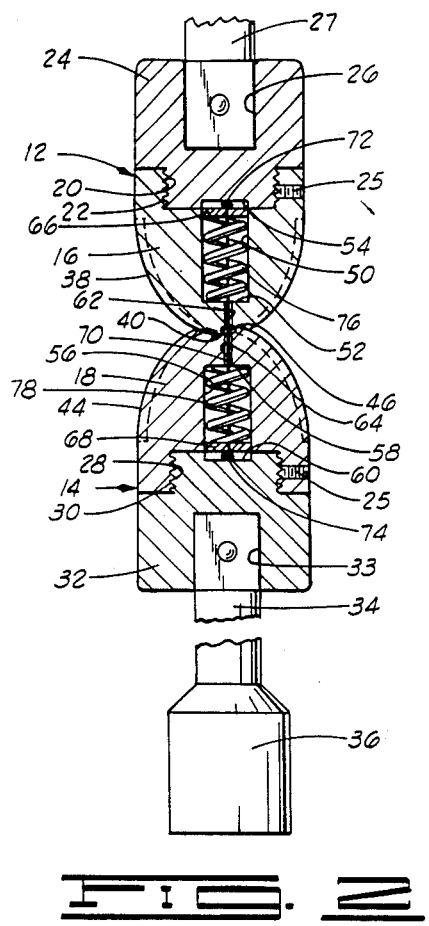
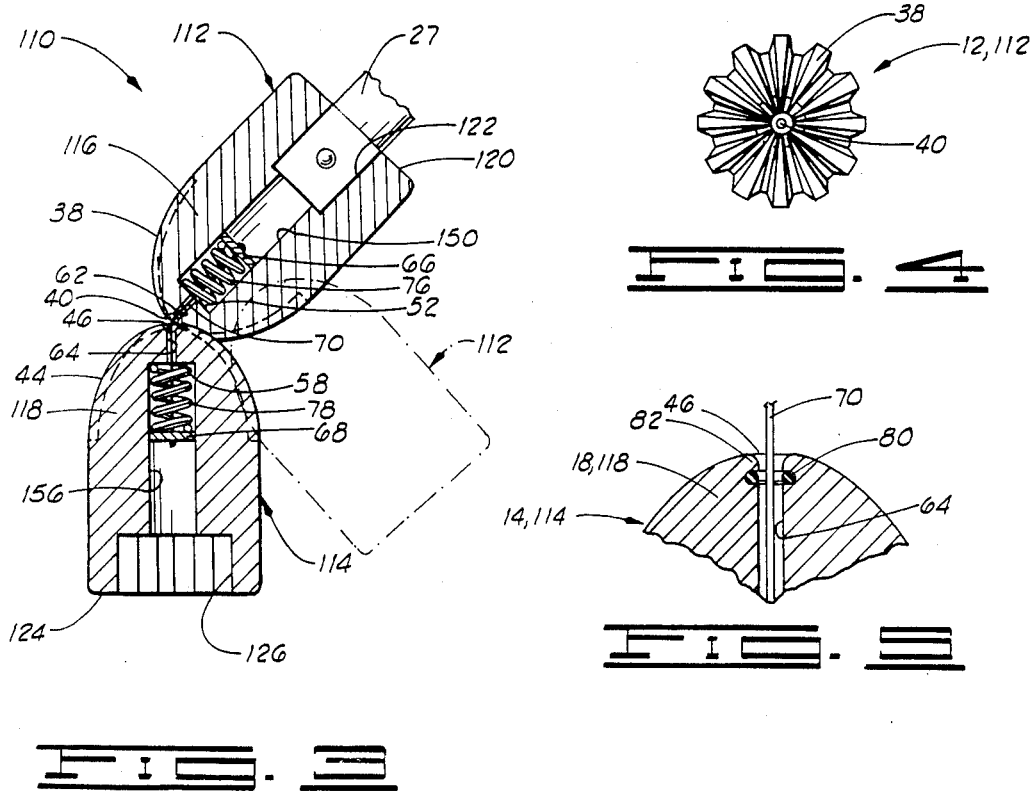

ated axes which may be angularly displaced and having teeth thereon which remain in mesh as the gears are rotated.

UNIVERSAL JOINT WITH INTERMESHING CURVILINEAR GEARS

BACKGROUND OF THE INVENTION

1. Field Of The Invention

This invention relates to universal joints, and more particularly, to a universal joint having intermeshing teeth on curved surfaces and adapted for attachment to a socket wrench or similar device.

2. Description Of The Prior Art

Universal joints are well known in the art, but most are complex and not easily adapted for use with such devices as socket wrenches. Universal joints typically are quite limited in the angle at which the two shafts connected thereto can be angularly displaced.

One universal joint which allows a fairly significant angular displacement between the two shafts is disclosed in U. S. Pat. No. 912,096 to Elkan. This apparatus includes two cylinder-like gear members having teeth on their inner ends and sides so that they may mesh with each other whether in or out of axial alignment. The gear members are connected to one another by a pair of pivotally connected links having collars on their outer ends. The collars are positioned in cavities within the gear members, and springs are used to bias the collars such that the gear members are maintained in meshing engagement. When the gears are angularly displaced, the links are free to slide axially within the gear members and pivot as necessary. One problem with such an arrangement is that the angular displacement of the gears may only occur in the plane in which the links are pivoted, unlike the present invention in which the elements may be pivoted in any direction at any time. Another problem is that upon rotation of the two shafts when in angular displacement, the links remain basically stationary. This requires that the springs must rotate on an inner shoulder within the gear members. This can cause undesirable friction and binding.

In a case where the shafts are to be parallel, an alternate embodiment of Elkan shows the inner ends of the links connected by a cable or other flexible connecting link. However, it is possible that this would not work properly, because the springs would cause the links to rotate with the shafts which in turn would cause the flexible cable to twist around the ends of the links in an undesirable manner.

The apparatus of the present invention solves these problems by eliminating the links and providing a flexible connection between spring biased plates. Thus, the binding problem of Elkan is eliminated. Further, the substantially curved gears of the present invention provide a much smoother angular displacement and transmission of rotating force than would be possible with Elkan.

The gearing device of Schulze-Berge, in U. S. Pat. No. 305,714, shows spherical and hemispherical gear members which are intermeshed. However, these gears are interconnected by a complex system of external links. The present invention which uses a simple flexible connector eliminates all of the problems and complexity of Shulze-Berge.

SUMMARY OF THE INVENTION

The universal joint of the present invention comprises first body means having a central axis and a curved surface defining a pole on the central axis, and a second body means adjacent the first body means, the second body means also having a central axis and a curved surface defining a pole on the second body means central axis. The first body means further has a plurality of spaced teeth extending from the pole along the curved surface of the first body means, and the second body means further has a plurality of spaced teeth extending from the pole along the curved surface of the second body means. The first and second body means are relatively pivotable such that the central axes thereof may be moved between an aligned position and a variable position angularly displaced with respect to one another. The teeth on the curved surface of the second body means are adapted for mutual meshing engagement with the teeth on the first body means for relative rotation between the first and second body means regardless of the position of angular displacement of the central axes thereof.

The universal joint further comprises flexible and resilient connecting means for interconnecting the first and second body means and maintaining the teeth thereon in meshing engagement during relative pivotation of the first and second body means in mutual rotation therebetween.

In the preferred embodiment, the first body means defines a substantially cylindrical central cavity or opening therein, the second body means also defines a substantially cylindrical central cavity or opening therein, the cavity in the first body means includes first shoulder means therein, and the cavity in the second body means includes second shoulder means therein.

The flexible and resilient connecting means preferably comprises a first seat or plate movably positioned in the cavity in the first body means, a second seat or plate movably positioned in the cavity in the second body means, a flexible wire or cable interconnecting the first and second seats, first biasing means disposed in the cavity in the first body means around the wire and between the first shoulder means and the first seat, and a second biasing means disposed in the cavity in the second body means around the wire between the second shoulder means and the second seat. The first and second biasing means are preferably characterized by springs.

In an alternate embodiment, the universal joint further comprises bushing means for guiding the flexible wire or cable, and the bushing means preferably comprises an elastomeric ring disposed adjacent the pole of the first body means and another elastomeric ring disposed adjacent the pole of the second body means. The elastomeric rings are best characterized by first and second nylon O-rings.

An important object of the present invention is to provide a universal joint having rotational elements which may be relatively pivoted in any direction at any time.

Another object of the present invention is to provide a universal joint having intermeshing substantially curved gears for transmission of rotational forces through shafts which may be axially aligned or angularly displaced.

An additional object of the present invention is to provide a universal joint with curved gears interconnected by a flexible and resilient connecting means which maintains the gears in meshing engagement while allowing mutual rotation without binding.

A further object of the present invention is to provide a universal joint having a pair of gear bodies with central cavities therein and connecting means including a flexible cable interconnecting the two cavities and having a plate attached to each end of the cable and positioned in the cavities with biasing means forcing the plates apart for maintaining the gears in engagement.

Still another object of the present invention is to provide a universal joint easily adapted for operative association with a wrench.

Additional objects and advantages of the present invention will become apparent as the following detailed description of the preferred embodiments is read in conjunction with the drawings which illustrate such preferred embodiments.

BRIEF DESCRIPTION OF THE DRAWINGS

FIG. 1 illustrates a first embodiment of the universal joint of the present invention as used in connecting two wrench portions.

FIG. 2 is a cross-sectional view of the first embodiment of the universal joint shown with two curved gear bodies axially aligned.

FIG. 3 is a cross section of a second embodiment of the invention showing the two curved gear bodies angularly displaced from one another.

FIG. 4 is an end elevation of one of the gear bodies as generally viewed from lines 4—4 in FIG. 1.

FIG. 5 is an enlarged cross section of the pole area of one of the gear bodies showing an alternate embodiment.

DESCRIPTION OF THE PREFERRED EMBODIMENT

Referring now to the drawings, and more particularly to FIG. 1, a first embodiment of the universal joint of the present invention is shown and generally designated by the numeral 10. Universal joint 10 includes first and second gear body means, preferably in the form of a first body 12 and a second body 14 adjacent the first body. First and second bodies 12 and 14 define central axes thereof, and as illustrated in FIG. 1, these axes may be aligned.

First body 12 has a curved portion 16 having a convexly curved outer surface, and second body 14 has a corresponding curved portion 18 with a convexly curved outer surface. Preferably, the curved surfaces are substantially hemispherical in configuration.

Referring now also to FIG. 2, it will be seen that curved portion 16 of first body 12 has an internally threaded surface 20. Threadingly engaged with threaded surface 20 is an external thread 22 of a base portion 24. Any locking means known in the art, such as set screw 25, may be used to prevent undesired disengagement of curved portion 16 and base portion 24.

Base portion 24 forms an end of first body 12 opposite curved portion 16 and has a square opening 26 adapted for attachment to a corresponding square end of a first wrench portion 27, such as a shaft of a ratchet wrench, in a manner known in the art.

Similarly, curved portion 18 of second body 14 has an internally threaded surface 28 which is threadingly engaged by external thread 30 of a base portion 32. Again, locking means, such as a set screw 25, are used to prevent undesired disengagement of curved portion 18 and base portion 32.

Base portion 32 forms an end of second body 14 opposite curved portion 18 and has a square opening 33 adapted for attachment to a corresponding square end of a second wrench portion 34, such as a socket extension or shaft with a socket 36 at the distal end thereof, in a manner known in the art.

Referring now to FIG. 3, a second embodiment of the universal joint of the present invention is shown and generally designated by the numeral 110. Universal joint 110 also includes first and second gear body means, preferably in the form of a first body 112 and a second body 114 adjacent first body 112. It will be seen that first and second bodies 112 and 114 are each formed of one-piece construction, unlike first and second bodies 12 and 14 of the first embodiment. However, first and second bodies 112 and 114 of the second embodiment also define central axes thereof, and these axes may be aligned just as the first embodiment, as illustrated in FIGS. 1 and 2.

First body 112 of the second embodiment has a curved portion 116 having a convexly curved outer surface which is substantially identical to curved portion 16 of first body 12 of the first embodiment. Second body 114 of the second embodiment has a corresponding curved portion 118 with a convexly curved outer surface. Curved portion 118 is substantially identical to curved portion 18 of second body 14 of the first embodiment. Preferably, the curved surfaces of curved portions 116 and 118 are substantially hemispherical in configuration.

First body 112 includes an end 120, opposite curved portion 116, having a square opening 122 therein adapted for attachment to a corresponding square end of first wrench portion 27, in a manner identical to the first embodiment.

Second body 114 includes an end 124, opposite curved portion 118, having a socket wrench opening 126 therein of a kind known in the art. Socket wrench opening 126 may be of any size or geometric configuration to be adaptable to fit any of the many known head configurations for fasteners. For example, socket opening 126 may be of hexagonal or twelve-point configuration for use in rotation of a hexagonal head bolt, but the invention is not limited to such a configuration.

Curved portion 16 of first body 12 and curved portion 116 of first body 112 both have a plurality of angularly spaced teeth 38 which extend from a pole 40 on the curved surface to a position along a side 42 of first body 12 or 112. This is best shown for the first embodiment in FIGS. 1 and 4, although the second embodiment is substantially identical. Teeth 38 gradually increase in width from pole 40 to side 42. As seen in FIG. 4, pole 40 is along the central axis of first body 12 or 112, and each tooth 38 is disposed such that it is substantially coplanar with the central axis of first body 12 or 112. Preferably, teeth 38 are equally spaced around curved portion 16 or 116.

In a substantially identical manner, curved portion 18 of second body 14 and curved portion 118 of second body 114 both have a plurality of angularly spaced teeth 44 thereon which extend from a pole 46 on the curved surface, indentified in FIGS. 2 and 3, to a position along a side 48 of second body 14 or 114. Similar to teeth 38, teeth 44 are each substantially coplanar with the central axis of second body 14 or 114.

As seen in FIGS. 1–3, teeth 38 of curved portion 16 or 116 of first body 12 or 112, respectively, are in gear-like meshing engagement with teeth 44 of curved portion 18 or 118 of second body 14 or 114, respectively. Thus, rotation of first body 12 or 112 will cause rotation of second body 14 or 114, respectively. Conversely, rotation of second body 14 or 114 will cause rotation of first body 12 or 112, respectively. This will be true whether first and second bodies 12 and 14, or first and second bodies 112 and 114, are axially aligned, as shown in FIGS. 1 and 2, or in a position in which the central axes thereof are angularly displaced, as shown in FIG. 3. In other words, rotation of first wrench portion 27 will result in concurrent rotation of second wrench portion 34 in the first embodiment or sucket wrench opening 126 in the second embodiment regardless of the relative angular positioning of the first body with the second body. As shown in FIG. 3 in phanton lines, the first and second body means in either embodiment may be relatively angularly displaced through an angle greater than 90° from the aligned position of FIGS. 1 and 2. It will be seen by those skilled in the art that the central axes of first and second bodies 12 and 14, or first and second bodies 112 and 114, are always substantially coplanar regardless of angular displacement.

Referring again to FIG. 2,. it will be seen that first body 12 defines a substantially cylindrical central cavity 50 therein. Preferably, the majority of cavity 50 is formed in curved portion 16 including one end 52 thereof. At least an opposite end 54 thereof is formed by base portion 24.

Second body 12 also defines a substantially cylindrical central cavity 56 therein with an end 58 formed in curved portion 18 and at least an opposite end 60 formed by base portion 32.

Referring to FIG. 3, it will be seen that first body 112 of the second embodiment defines a substantially cylindrical central cavity 150 therein. Central cavity 150 is very similar to central cavity 50 in the first embodiment and includes an end 52 formed in curved portion 116. Rather than having an opposite end, however, central cavity 150 preferably opens into square opening 122.

Second body 112 of the second embodiment also defines a substantially cylindrical central cavity 156 therein. Again, central cavity 156 is very similar to central cavity 56 in the first embodiment and has an end 58 formed in curved portion 118. Rather than having an opposite end, however, central cavity 156 preferably opens into socket wrench opening 26.

Curved portion 16 of first body 12 and curved portion 116 of first body 112 both define an axially disposed hole 62 therein providing communication between central cavity 50 or 150, respectively, adjacent wall 52 and pole 40 at the outer surface of the corresponding curved portion. Similarly, second body 14 and second body 114 both define an axially disposed hole 64 therein providing communication between central cavity 56 or 156, respectively, adjacent end 58 and pole 46 at the outer surface of the corresponding curved portion. It will be seen that when either universal joint 10 or 110 is in the aligned position illustrated in FIGS. 1 and 2, holes 62 and 64 are also aligned.

Reciprocably positioned in central cavity 50 or 150 is a first seat or plate 66, and a similar second seat or plate 68 is reciprocably positioned in central cavity 56 or 156. Providing flexible connecting means for interconnecting first and second plates 66 and 68 is a flexible cable or wire 70. Cable 70 extends through cavities 50 and 56, or through cavities 150 and 156, and holes 62 and 64. Cable 70 has two opposite ends which pass through plates 66 and 68, respectively, and are attached thereto in a manner known in the art, such as by forming knots 72 and 74 behind the plates.

A spring 76 is positioned around cable 70 between end 52 of cavity 50 or 150 and plate 66. Thus, end 52 of cavity 50 or 150 acts as shoulder means for spring 76, and the spring provides biasing means for biasing plate 66 in a direction away from end 52. Another spring 78 is positioned in cavity 56 or 156 in a similar manner providing biasing means for biasing plate 68 away from end 58. Thus, flexible cable 70 and springs 76 and 78 provide a flexible and resilient connecting means between first body 12 and second body 14 in the first embodiment, or between first body 112 and second body 114 in the second embodiment, for holding the bodies adjacent one another and maintaining teeth 38 and 44 in meshing engagement.

When the first body means and second body means are angularly displaced with respect to one another, as illustrated in FIG. 3, it will be seen that they will still be held in such engagement by the flexible and resilient connecting means. As angular displacement occurs, plates 66 and 68 are pulled toward poles 40 and 46, respectively, compressing springs 76 and 78, respectively. If first body 12 or 112 is rotated, second body 14 or 114 will be rotated because of the gearlike engagement of teeth 38 and 44. As rotation occurs, cable 70 will also rotate. In this way, spring 76 and plate 66 move with first body 12 or 112, and spring 78 and plate 68 move with second body 14 or 114.

It will be seen by those skilled in the art that universal joint 10 or 110 thus has elements which may be pivoted in any direction at any time, and mutual rotation is assured as long as teeth 38 and 44 are meshed.

Referring now to FIG. 5, which is an enlarged view of the end of either curved portion 18 of second body 14 or curved portion 118 of second body 114 adjacent pole 46 thereof, an alternate bushing means, preferably in the form of a nylon O-ring 80, may be disposed in hole 64 adjacent outer end 82 thereof and pole 46. An identical arrangement, not shown, may be provided in either curved portion 16 of first body 12 or curved portion 116 of first body 112. O-ring 80 acts to guide cable 70 in such a manner that contact by cable 70 with body portion 14 or 114 is minimized. In other words, much of the frictional contact of cable 70 is preferably on O-ring 80, thus minimizing the wear on cable 70. This also serves to minimize the likelihood of binding of U-joint 10 or 110 during rotation.

It will be seen, therefore, that the universal joint of the present invention is well adapted to carry out the ends and advantages mentioned, as well as those inherent therein. While several presently preferred embodiments of the invention are described for the purposes of this disclosure, numerous changes in the arrangement and construction of parts may be made by those skilled in the art. All such changes are encompassed within the scope and spirit of the appended claims.

What is claimed is:

1. A universal joint comprising:
   first body means having a central axis and a curved surface defining a pole on said axis, said first body means further having a plurality of spaced teeth extending from said pole along said curved surface;
   second body means adjacent said first body means, said second body means having a central axis and a curved surface defining a pole on said central axis of said second body means, said second body means further having a plurality of spaced teeth extending from said pole of said second body means along said curved surface of said second body means, said first and second body means being relatively pivotable such that said central axes thereof may be moved between an aligned position and a position angularly displaced from one another, said teeth on said curved surface of said second body means being adapted for meshing engagement with said teeth on said curved surface of the first body means for relative rotation between said first and second body means regardless of the position of angular displacement of said central axes;

flexible and resilient connecting means for interconnecting said first and second body means and maintaining said teeth in said meshing engagement during relative pivotation of said first and second body means in any direction and mutual rotation therebetween;

a first O-ring disposed adjacent said pole of said first body means and coaxial therewith for guiding at least a portion of said flexible and resilient connecting means when said central axes are in a position of angular displacement; and a second O-ring disposed adjacent said pole of said second body means for guiding another portion of said flexible and resilient connecting means when said central axes are in a position of angular displacement.

2. The universal joint of claim 1 wherein;
said first body means defines a central cavity therein;
said second body means defines a central cavity therein;
said cavity in said first body means includes first shoulder means therein;
said cavity in said second body means includes second shoulder means therein; and
said flexible and resilient connecting means comprises:
  a first seat movably positioned in said cavity in said first body means;
  a second seat movably positioned in said cavity in said second body means;
  a flexible wire interconnecting said first and second seats;
  first biasing means disposed in said cavity in said first body means around said wire and between said first shoulder means and said first seat; and
  second biasing means disposed in said cavity in said second body means around said wire between said second shoulder means and said second seat.

3. The apparatus of claim 2 wherein said first and second biasing means are characterized by springs.

4. The universal joint of claim 2 wherein said first and second O-rings guide said wire.

5. A universal joint comprising:
first and second bodies, each of said first and second bodies having a central axis and comprising:
  a portion with a convexly curved surface defining a pole along said central axis;
  a plurality of gear teeth formed on said curved surface and extending from said pole such that each tooth is substantially coplanar with said central axis, said teeth on said first body being adapted for engagement with said teeth on said second body, said first and second bodies being relatively movable such that the central axis of one may be angularly displaced from the central axis of the other in any direction; and
  a portion defining a central cavity therein and a hole therein coaxial with said central axis thereof, said hole providing communication between said central cavity and said pole;

first and second plates positioned in said cavities of said first and second bodies, respectively, and facing the corresponding hole;

flexible connecting means for interconnecting said first and second plates regardless of the direction of angular displacement between said first and second bodies;

biasing means disposed in said cavities for biasing said first and second plates apart and thereby holding said first and second bodies adjacent one another and maintaining said teeth in said engagement regardless of the direction of angular displacement between said first and second bodies;

first and second O-rings disposed in said holes of said first and second bodies, respectively, said O-rings being coaxial with said poles and adjacent thereto, and said O-rings providing bushing means for guiding said wire and minimizing contact thereof with said first and second bodies.

6. The universal joint of claim 5 wherein each of said first and second bodies further comprises a base portion forming at least one wall of said cavity.

7. The universal joint of claim 6 wherein each of said base portions is adapted for attachment to a portion of a wrench.

8. The universal joint of claim 5 wherein one of said first and second bodies defines a socket wrench opening therein.

9. The universal joint of claim 5 wherein said biasing means is characterized by a spring in each of said cavities between the corresponding plate and a shoulder of the corresponding cavity adjacent the corresponding hole such that each plate is biased away from the corresponding shoulder.

10. The universal joint of claim 5 wherein said teeth gradually increase in width away from said pole.

11. The universal joint of claim 10 wherein said teeth are substantially equally spaced.

12. The universal joint of claim 5 wherein said flexible connecting means comprise a wire attached to each of said plates and extending through said holes in said first and second bodies.

13. A universal joint comprising:
a first body comprising:
  a curved surface defining a pole on a central axis of said first body;
  a plurality of spaced gear teeth on said curved surface and extending from said pole to a position along a side of said first body; and
  an end opposite said curved surface;
  said first body defining a substantially cylindrical cavity therein and an axially extending hole interconnecting a shoulder in said cavity and said pole;
a second body comprising:
  a curved surface defining a pole on a central axis of said second body;
  a plurality of spaced gear teeth on said curved surface of said second body and extending from said pole of said second body to a position along a side of said second body, said gear teeth of said second body being adapted for meshing engagement with said gear teeth of said first body; and
  an end opposite said curved surface of said second body;

said second body defining a substantially cylindrical cavity therein and an axially extending hole interconnecting a shoulder in said cavity in said second body and said pole of said second body;

a first plate reciprocably positioned in said cavity of said first body;

a second plate reciprocably positioned in said cavity of said second body;

a flexible cable extending through said holes in said first and second bodies and fixedly attached to each of said plates;

biasing means disposed in each of said cavities for biasing said first and second plates away from the corresponding shoulders of the cavities such that said cable and biasing means keep said first and second bodies in meshing engagement and allow relative pivotal displacement of said bodies in any direction; and an elastomeric ring disposed in each of said holes adjacent the corresponding pole of said first and second bodies, said elastomeric rings being adapted for guiding said cable and for minimizing contact between said cable and said first and second bodies during relative pivotation and mutual rotation of said first and second bodies.

14. The universal joint of claim 13 wherein the end of at least one of said first and second bodies is adapted for attachment to a wrench portion.

15. The universal joint of claim 13 wherein the end of at least one of said first and second bodies defines a socket wrench opening therein.

16. The universal joint of claim 13 wherein said biasing means comprises:

a first spring positioned around said cable and positioned between said first plate and said shoulder of said cavity in said first body; and a second spring positioned around said cable and positioned between said second plate and said shoulder of said cavity in said second body.

17. The universal joint of claim 13 wherein said teeth increase in width from said pole to said position along the side of the corresponding body.

* * * * *